United States Patent [19]

Lessig, III

[11] 4,351,143

[45] Sep. 28, 1982

[54] GROUND SUPPORT SYSTEM FOR A GRASS CUTTING MACHINE

[75] Inventor: William R. Lessig, III, Cockeysville, Md.

[73] Assignee: Black & Decker Inc., Newark, Del.

[21] Appl. No.: 259,485

[22] Filed: Apr. 30, 1981

[51] Int. Cl.³ .......................................... A01D 35/26
[52] U.S. Cl. ..................................... 56/17.5; 56/320.1
[58] Field of Search .................... 56/320.1, 320.2, 255, 56/17.1, 17.2, 17.5

[56] References Cited

U.S. PATENT DOCUMENTS

| | | | |
|---|---|---|---|
| 1,992,494 | 2/1935 | Lundin | 56/17.2 |
| 2,488,140 | 11/1949 | Phillips et al. | 56/17.2 |
| 2,490,870 | 12/1949 | Heyn | 56/17.1 |
| 2,545,074 | 3/1951 | Dielschneider | 56/255 |
| 4,232,505 | 11/1980 | Walto | 56/320.1 |

FOREIGN PATENT DOCUMENTS 259749  6/1955  Australia ............................. 56/17.1

Primary Examiner—Jay N. Eskovitz
Attorney, Agent, or Firm—Harold Weinstein; Edward D. Murphy; Walter Ottesen

[57] ABSTRACT

A three point ground support system for a grass cutting machine having two rear wheels and a front roller of sufficient width to minimize the rolling resistance and provide a sufficiently stable support to produce a level cut. The two rear wheels are mounted inboard of the cutting circle but rearwardly thereof. Only the front roller is within the cutting circle and below the cutting plane of the cutting blades. The support brackets for the roller have a portion outside the cutting circle. The cutting circle of the cutting blades permits visible front and side cutting, and may be combined with a deflectable cutting blade.

6 Claims, 4 Drawing Figures

U.S. Patent     Sep. 28, 1982     4,351,143
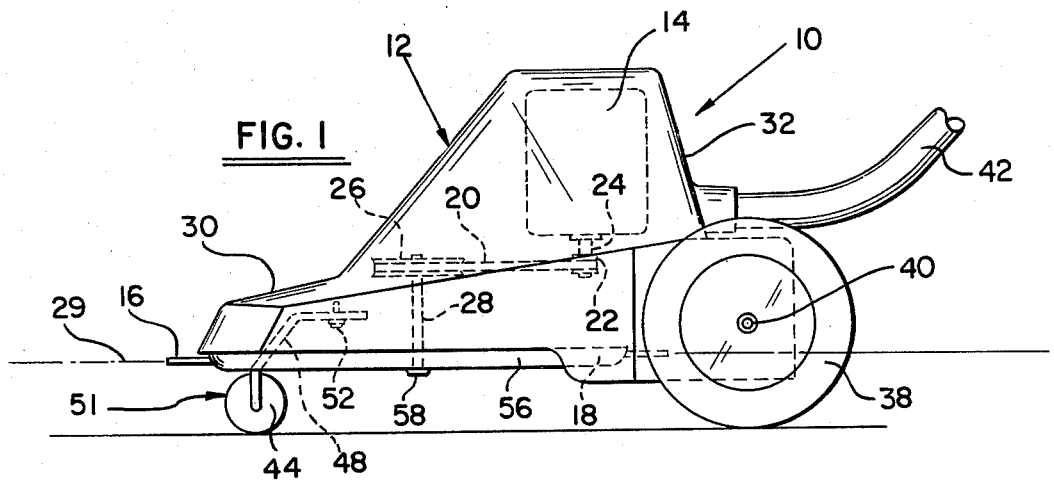
FIG. 1
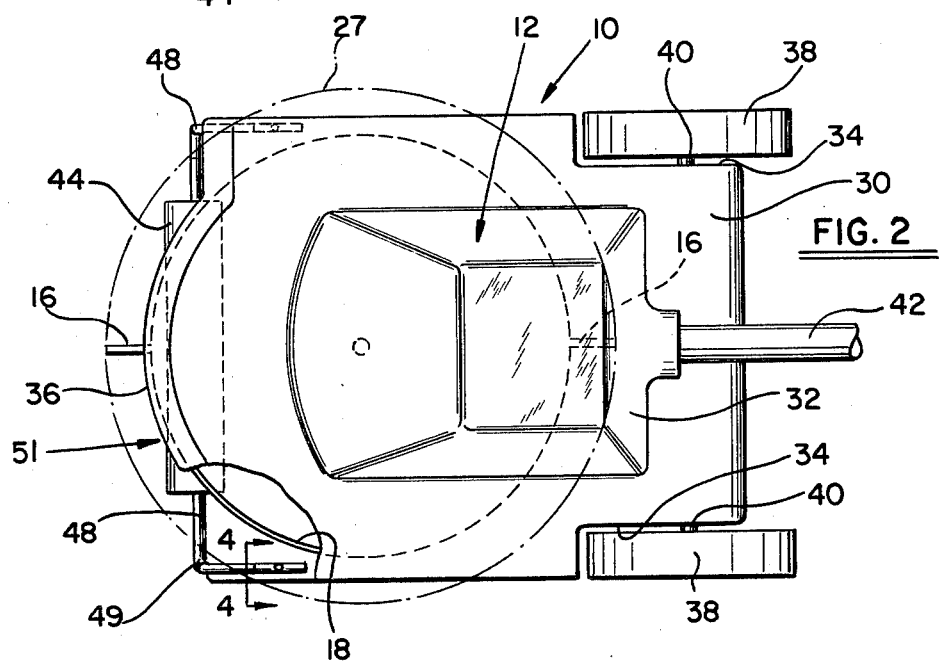
FIG. 2
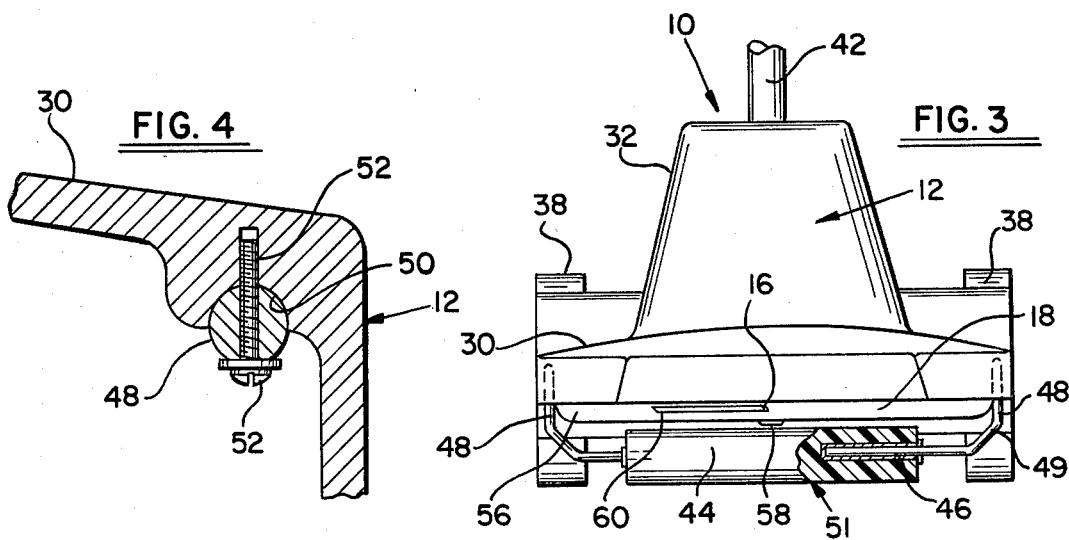
FIG. 4
FIG. 3

GROUND SUPPORT SYSTEM FOR A GRASS CUTTING MACHINE

CROSS-REFERENCE TO A RELATED APPLICATION

A more detailed explanation of the cutting mechanism set forth herein will be found in my copending case, assigned to the same assignee, entitled "Cutting Mechanism for a Grass Cutting Machine", U.S. Ser. No. 259,484, Filed Apr. 30, 1981.

BACKGROUND OF THE INVENTION

1. Field of the Invention

A ground support for a grass cutting machine, of the rotary type, having a three point support system providing improved stability for an even cut over a wide range of ground conditions, and high visibility at the front and sides thereof to permit easy trimming of the lawn, especially at the edges and at shrubs. A flexible blade is used as the cutting member to permit deflection thereof upon impact with any obstacle.

2. Description of the Prior Art

Grass cutting machines of the prior art have used wheels for ground support, generally with two in front and two in the rear, though the width and spacing may have varied.

Earlier grass cutting machines, particularly of the reel type, used two front wheels, and a rear roller to provide ground support.

One prior art grass cutting machine, U.S. Pat. No. 1,831,681, uses a rotary cutter with a support frame having two front wheels, and a rear roller of the type more often found in the reel mowers.

The prior art grass cutting machines had alternate problems of poor visibility at the front and sides thereof and/or poor stability which tended to produce an uneven cut, especially in areas of uneven terrain.

SUMMARY OF THE INVENTION

A grass cutting machine according to the invention, utilizes a pair of rear wheels mounted to a frame inboard of and to the rear of the cutting swath, and a forward roller mounted entirely within the cutting swath.

It is an object of the present invention to provide an improved ground support for a grass-cutting machine which overcomes the prior art disadvantages; which is simple, economical and reliable; which provides for a level cut and minimizes scalping; and, which provides a stable three point ground support.

A further object of the present invention is to provide an improved ground support for grass-cutting machine which does not hinder ability of the machine to trim close to edges and shrubs; which maintains visibility of the cutting interface, especially at the front and sides; and which uses a deflectable blade.

Other objects and advantages will be apparent from the following description of one embodiment of the invention and the novel features will be particularly pointed out hereinafter in the claims.

BRIEF DESCRIPTION OF THE DRAWINGS

The invention is illustrated in the accompanying drawings in which:

FIG. 1 is a side elevational view of a ground support for a grass cutting machine embodying the present invention;

FIG. 2 is a top plan view of the present invention;

FIG. 3 is a front elevational view, partly in section, of the present invention; and FIG. 4 is a partial sectional view taken along the lines 4—4 showing the details of the attachment of the support member of the roller to the housing.

DESCRIPTION OF THE PREFERRED EMBODIMENT

In the illustrated embodiment of the invention a grass cutting machine 10, of the rotary type, is shown in FIGS. 1, 2 and 3. The machine has a housing 12 in which is mounted a suitable power source such as an electric motor 14, though an internal combustion engine could also have been used. The motor 14 drives a plastic strip-like blade 16 carried on a disc 18 via a belt-drive including a belt 20 driven by a pulley 22 on shaft 24 of motor 14. Belt 20 drives a pulley 26 mounted on a shaft 28 which rotates the disc 18. The blade 16 prescribes a cutting circle 27 shown in dotted line representation in FIG. 2, which lies in a plane 29 shown only in FIG. 1.

The housing 12 has a deck 30 which extends outwardly from the bottom of a central motor portion 32 thereof in the form of a substantial rectangle having a stepped inset 34 at opposite rear corners thereof, and a arcuate edge 36 centrally disposed at the front end thereof in superposition to the disc 18. Rear wheels 38 are separately disposed to nest in the insets 34 of the deck 30 so as to provide a smooth side profile while extending slightly beyond the rear edge thereof. Each of the wheels 38 are journaled by an axle 40 affixed to the housing 12 inwardly of the inset 34 of the deck 30 and above the cutting plane 29. The diameter of each of the rear wheels 38 is greater than their width as seen in FIGS. 1, 2 and 3, and each wheel 38 is mounted inboard of the cutting swath or circle 27 and to the rear thereof. A handle 42 is connected to the rear of the motor portion 32 of the housing 12 above the deck 30 thereof and central to the wheels 38. The handle 42 will guide the machine 10 over the cutting surface and will be manipulated by the operator so as to cause either of the wheels 38 to act as pivot points in steering the machine 10. The diameter of the wheel 38 is sufficiently large so as to minimize rolling resistance which might otherwise be present with a small diameter wheel in that it might have a tendency to dig into the turf. The wheels 38 are mounted on opposite sides of the housing 12 to provide a wide support at the rear of the housing 12 which defines two points of the three point ground support system of the present invention.

A third and final point of ground support for the machine 10 is provided by a roller 44 which extends under the disc 18 at the front edge of the deck 30 for a length substantially corresponding to that of the arcuate edge 36. While the diameter of the rear wheels 38 was much greater than their respective widths, the roller 44 has a width which greatly exceeds its diameter as shown in FIGS. 1 and 2. The roller 44 is journaled as shown in FIG. 3 by bushings 46 extending inwardly from either end thereof to separately receive the free end of a support leg or bracket 48. The roller 44 is mounted below the cutting plane 29 and within the cutting circle 27. The bracket 48 is substantially "L" shaped and may be in the form of a bent rod. The bracket 48 as shown in FIGS. 3 and 4 is a circular cross section of small diameter so that only a small area will be present at any location and thereby prevent the build-up of grass clippings thereon and this is further reduced by forming the juncture of the legs thereof at an angle of 45° as at 49 shown best in FIG. 3. The bracket 48 is received within a circular recess 50 as shown in FIG. 4 and secured to the housing 12 therein by a bolt 52 threadedly received in a tapped hole in the housing 12. The brackets 48 will be secured to opposite front corners of the deck 30 of the housing 12 so as to extend forwardly to a point outside of the cutting circle 27 before turning vertically downwardly to extend below the disc 18 and be turned perpendicular to extend into journaled engagement within the bushing 46 of the roller 44. It is apparent that the two brackets 48 journal with the roller 44 to combine and form a front "U" shaped support assembly 51, which could likewise be formed from a single bracket rather than a pair.

In comparing the relative diameters or cross-section of the ground support, wheels 38, roller 44 and bracket 48 are sized in successively decending order wherein the diameter of the roller 44 is substantially less than one-half the diameter of wheel 38, while the diameter of the rod of the bracket 48 is substantially less than one-half the diameter of the roller 44.

Though the roller 44 is of a small diameter in comparison to the wheel 38, the extensive width of the roller 44 provides a wide foot path which will not interfere with the blades of grass to be cut in that it is completely within the cutting swath 27 so that for the most part the blades of grass will have already been cut before being contacted by the roller 44, but also, in view of the small diameter such blades of grass will not be crushed into a deformed position but rather will spring back to a vertical position after rolling contact with the roller 44. The mounting of the roller 44 permits it to lie underneath the cutting blade 16 and disc 18 so as not to interfere with the normal cutting operation thereof. Also, this permits the blade to extend from both the front and opposite sides of the deck 30 as shown in FIG. 2. The ground support provided by the three point system of the front roller 44 and the two rear wheels 38 is very stable and provides for a level cut corresponding to the cutting plane 29 in that small ground unevenness will go unnoticed by the wide foot path of the roller 44 which in other types of ground supports of conventional design might otherwise have caused the machine 10 to tilt or tip resulting in an uneven cut at that section of grass.

The bottom of the disc 18 is provided with a cover 56 which supports the disc 18 and is secured to the shaft 28 by a nut 58 as shown in FIGS. 1 and 3. Removal of the nut 58 permits the cover 56 to be removed in order to replace the disc 18 and/or one or more of the cutting strips 16 mounted therein. The cover 56 may be suitably slotted as at 60 as shown in FIG. 3 to permit egress of the cutting strip 16.

In operation, the cutting blade 16 rotates in the cutting circle 54 and is suitably shaped to create a "fan effect" which draws the blades of the grass into a vertical position for better cutting thereof. The three point ground support system provided by the two rear wheels 38 and the front roller 44 maintain continuous contact with the ground over a wide range of ground conditions. The front roller 44 especially assures a level cut while permitting the machine 10 to cut close to lawn edges and around shrubs that conventional front wheels might have blocked from the cutting view of the operator.

The cutting circle 27 is located preferably as shown in FIG. 2, however, if desired it can be sized to be wholly within the deck 30 of the housing 12, or shifted rearwardly therein. Alternately, suitable guards could be added at the sides and front of the deck 30.

It will be understood that various changes in the details, materials, arrangements of parts and operating conditions which have been herein described and illustrated in order to explain the nature of the invention may be made by those skilled in the art within the principle and scope of the invention.

I claim:

1. A grass cutting machine having a motor powered cutting blade defining a cutting circle lying in a substantially horizontal plane, the machine comprising:
   (a) a housing carrying the motor and to journal the cutting blade in a substantially vertical axis,
   (b) the housing having a front, a rear, and opposed sides extending therebetween to terminate at right and left front corners and right and left rear corners,
   (c) the front and opposed sides of the housing each having substantial portions thereof within the cutting circle,
   (d) a pair of wheels journaled at opposite sides of the rear of the housing with their axes disposed above the plane of the cutting circle.
   (e) a roller disposed below the plane of the cutting circle and within the cutting circle to extend longitudinally across the front of the housing, and
   (f) support means journaling the roller, and extending therefrom within the cutting circle and below the cutting plane to intersect the cutting plane outside of the cutting circle adjacent the front corners for connection to the housing above the cutting plane.

2. The combination claimed in claim 1 wherein:
   (a) the support means defining a pair of "L" shaped rods having one end thereof journaling the roller from opposite ends along an axis parallel to the axis of the rear wheels, and the other end thereof affixed to the housing parallel to the sides thereof.

3. The combination claimed in claim 2 wherein:
   (a) each of the support rods having an angled section intermediate its ends whereby any build up of grass cuttings is minimized.

4. The combination claimed in claim 1 wherein:
   (a) the right and left front corners of the housing and the rear thereof lie outside of the cutting circle, and
   (b) the support means intersect the cutting plane at the right and left front corners outside of the cutting circle.

5. The combination claimed in claim 4 wherein:
   (a) insets formed at opposite corners of the rear of the housing inwardly of the sides thereof and disposed outside the cutting circle, and
   (b) the wheels mounted to the housing within the insets whereby the wheels will not interfere with the cutting on either side of the housing.

6. The combination claimed in claim 5 wherein:
   (a) the roller disposed in front of the vertical axis of the cutting blade with the front of the housing in superposition thereto.

* * * * *